C. BEMIS.
Car Brake.
No. 60,850.
Patented Jan. 1, 1867.
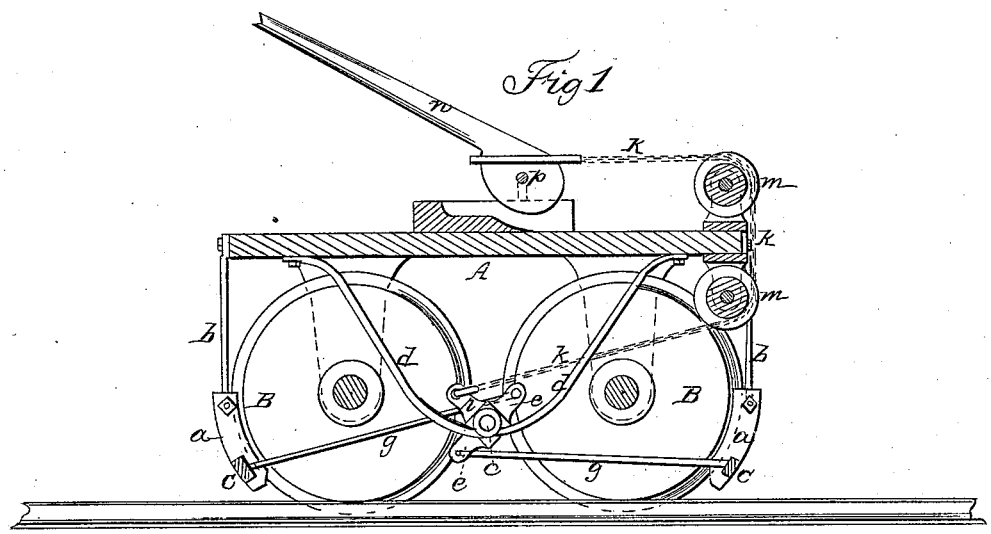
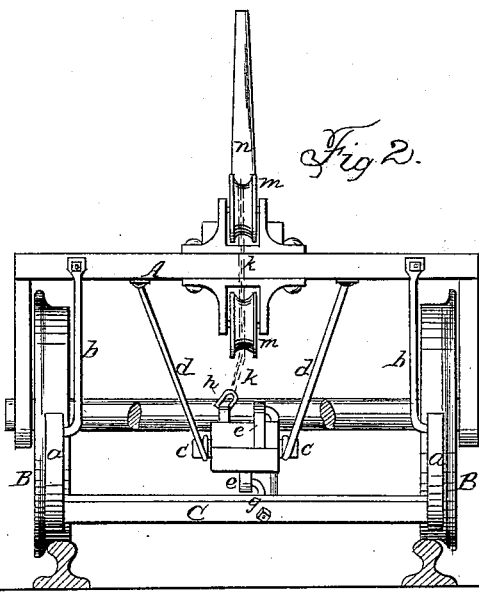

United States Patent Office.

CHARLES BEMIS, OF MISHAWAKA, INDIANA.

Letters Patent No. 60,850, dated January 1, 1867.

---

IMPROVED CAR-BRAKE.

---

*The Schedule referred to in these Letters Patent and making part of the same.*

---

TO ALL WHOM IT MAY CONCERN:

Be it known that I, CHARLES BEMIS, of Mishawaka, in the county of St. Joseph, and State of Indiana, have invented a new and useful improvement in Railroad Car-Brakes; and I do hereby declare that the following is a full, clear, and exact description thereof, which will enable others skilled in the art to make and use the same, reference being had to the accompanying drawings, forming part of this specification, in which—

Figure 1 is a longitudinal vertical section of one end of a platform car, to which my improved brake is attached.

Figure 2, an end view of the same.

Similar letters of reference indicate like parts.

This invention relates to a new and improved arrangement of a brake apparatus for railroad cars, and consists in the application of a lever, which has a powerful purchase upon the ordinary shoe brake attached to the four wheels of a truck at one end of a car, operating by means of a chain over pulleys upon a shaft under the truck, on which are lever arms working in opposite directions, connected by rods with the shoes.

A is the platform of the car; $a\ a$ are the shoes, which bear upon the outside of the four wheels B on the truck at one end of the car. The shoes $a\ a$, on each pair of the wheels, are connected by cross-bars, C C, at each end of the truck, and are suspended to the body of the car by rods, $b\ b$, upon which rods they have limited vibratory motion longitudinally with the car. A shaft, $c$, is hung transversely under the middle of the truck, between the wheels, upon iron rods, $d\ d$, or in any suitable manner, on which shaft are two projecting arms, $e\ e$, the ends of which are connected by rods or bars, $g\ g$, with the cross-bars C C which carry the shoes $a\ a$. On the shaft $c$ is a third arm, $h$, projecting at right angles to the two arms $e\ e$, and connected by a chain, $k$, which passes over pulleys, $m\ m$, with a lever, $n$, on the platform of the car. The chain $k$ is connected with the lever $n$ near its fulcrum, $p$, at the end, and the arrangement is such that when the lever arm is depressed the power of the lever increases as the brakes are thus operated, so that they are more effective on the wheels when the depression of the lever is greatest.

Having described my invention, I claim as new, and desire to secure by Letters Patent—

The arrangement of the lever $n$, the chain $k$, the pulleys $m\ m$, and the shaft $c$, connected with the shoes $a\ a$ by the arms $e\ e$ and the rods $g\ g$, to operate as a railroad car-brake, as herein described.

CHARLES BEMIS.

Witnesses:
FREDERICK J. BAKER,
ELIJAH TAYLOR.